March 9, 1971
C. C. KING
3,568,244
PROCESS AND APPARATUS FOR SUPPORTING
MEAT PRODUCTS FOR CURING
Filed Jan. 2, 1968
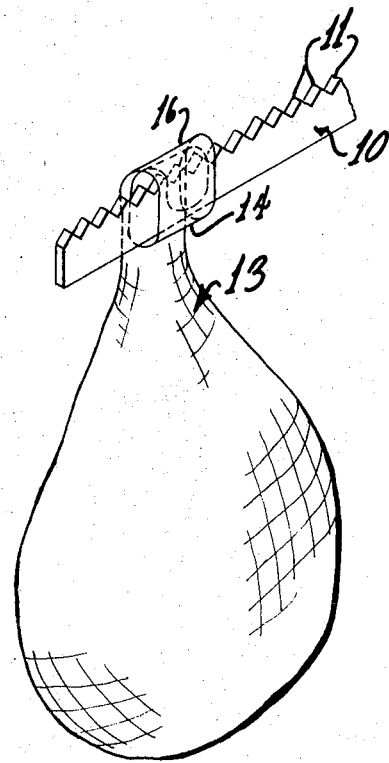
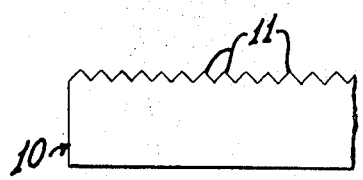
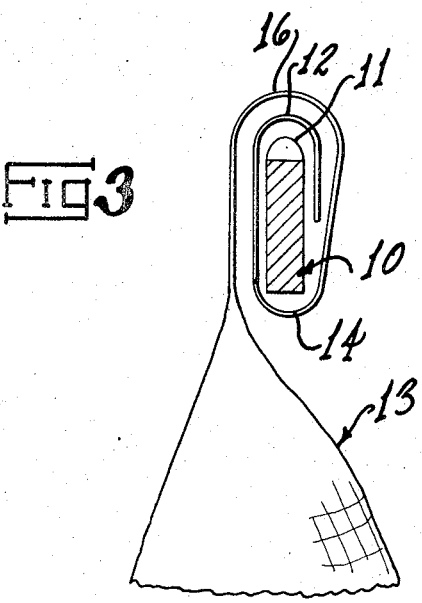
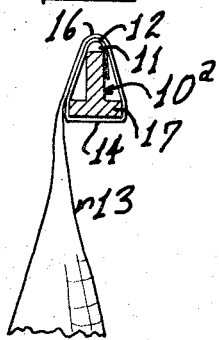
INVENTOR.
Charles C. King
BY
Jennings, Carter + Thompson
Attorneys

United States Patent Office 3,568,244
Patented Mar. 9, 1971

3,568,244
PROCESS AND APPARATUS FOR SUPPORTING
MEAT PRODUCTS FOR CURING
Charles C. King, Jacksonville, Ala., assignor to
Brecon Knitting Mills, Inc.
Filed Jan. 2, 1968, Ser. No. 694,986
Int. Cl. A22c 15/00
U.S. Cl. 17—45                                       1 Claim

ABSTRACT OF THE DISCLOSURE

Process for supporting meat products for curing within stockinette-like members having a free end extending outwardly of the product. Upstanding friction members are provided on an upper portion of an elongated support bar frictionally engaging the free end of each stockinette member. Upon placing the free end of the stockinette member over the bar and wrapping the stockinette member around and under the bar and then over said free end, the weight of the product urges the portion of the stockinette member superjacent the free end into engagement with said free end.

BACKGROUND OF THE INVENTION

This invention relates to a process for supporting meat products for curing and more particularly to means for supporting hams, bacon, sausages and other cuts of meat for smoking and other curing processes.

Heretofore in the art to which my invention relates, meat products, such as hams, sausages and the like have been cured by placing a stockinette member about the meat product and then passing a support hook or rod through the open mesh of the stockinette member whereby the stockinette is often torn or ripped as the heavy product is supported for smoking. Some heavy meat products, such as hams, exert such a force on the connection between the hook or rod member and the individual strands of the stockinette member that the strands are broken one at a time until the meat product falls into the fire where it is ruined.

BRIEF SUMMARY OF THE INVENTION

In accordance with my improved process, the meat products are supported for curing within a stockinette member having a free end extending outwardly of the product. Upstanding friction members are provided on an upper portion of an elongated support bar which frictionally engage the free end of the stockinette member so that upon placing the free end of the stockinette member over the upper portion of the bar and wrapping the stockinette member around and under the bar and then over the free end of the stockinette member, the weight of the meat product urges the portion of the stockinette member superjacent the free end of the stockinette member into engagement with the free end to thus secure the stockinette member firmly to the elongated support bar. That is, the free end of the stockinette member is firmly clamped between the elongated supporting bar and the superjacent portion of the stockinette member whereby the gripping engagement of the free end of the stockinette member with the elongated support bar is proportional to the downward force exerted by the portion of the stockinette member which engages the upper surface of said free end of the stockinette member.

Apparatus embodying features of my invention is illustrated in the accompanying drawing, forming a part of this application, in which:

FIG. 1 is a perspective view showing a meat product supported from an elongated support member in accordance with my invention;

FIG. 2 is a side elevational view of a fragment of the elongated support bar;

FIG. 3 is a vertical sectional view through the elongated support bar shown in FIGS. 1 and 2 and showing the manner in which the free end portion of the stockinette member overlaps and surrounds the elongated support bar; and, FIG. 4 is a sectional view corresponding to FIG. 3 but showing a modified form of my invention and showing the free end portion of the stockinette member moved into clamping engagement with the upper portion of the elongated support member.

Referring now to the drawing for a better understanding of my invention, I show an elongated support member 10 which is adapted to be supported in position to place depending meat products secured thereto in proper relation to the smoke producing apparatus. The elongated support member 10 extends in a generally horizontal plane and is provided with upstanding friction members 11 which may be in the form of projections along the upper portion thereof in position to engage frictionally the free end 12 of a stockinette member 13 which encases a meat product, such as a ham shown in FIGS. 1 and 3. As shown in FIGS. 1 and 2, the upstanding projections 11 are spaced longitudinally from each other and are of a size and in position to enter the interstices of the open-mesh stockinette material forming the free end 12. The upstanding projections are in the form of upwardly tapered teeth-like members, as shown, to facilitate movement of the projections into the interstices of the stockinette material. While I have shown the friction members 11 as being projections, it will be apparent that the friction members may be formed of various types of friction members 11 in overlapping relation, as clearly 12 of the stockinette member 13, such as coarse sandpaper and the like.

To attach the stockinette member 13 encasing the meat product to the elongated member 10, the free end 12 is placed over the upper portion carrying the upstanding friction members 11 in overlapping relation, as clearly shown in FIG. 3. The free end 12 is thus in position to frictionally engage the upstanding friction members 11 upon applying downward pressure thereto. The portion of the stockinette member 13 adjacent the free end 12 is then wrapped around and under the elongated support bar 10 as at 14 and is then positioned over the free end 12 as at 16 whereupon the weight of the meat product in the stockinette member 13 exerts a downward force to move the portion of the stockinette member 13 superjacent the free end 12 into firm engagement with the free end 12 whereby the force moving the free end 12 into engagement with the teeth 11 is proportional to the weight of the meat product carried by the stockinette member 13. The heavy meat product thus exerts a force which draws the portion of the stockinette member superjacent the free end 12 into firm engagement with the free end 12 whereby the end of the stockinette member 13 is firmly clamped to the elongated bar 10 over a relatively large area so that there is no excessive strain imparted to any individual strands of the stockinette material forming the free end 12. Accordingly, there is no slippage between the elongated support member 10 and the end of the stockinette member 13 attached thereto. Also, the free end 12 of the stockinette member 13 forms a cushion for the superjacent portion of the stockinette member whereby the load supported by the superjacent portion is supported over a wide cushion area, thus preventing cutting indiviudal strands of the superjacent portion and thereby eliminating runs in the stockinette member. Accordingly, there would be no runs in the stockinette member at the point of support of the superjacent portion which is connected directly to the portion of the stockinette encasing the meat product.

In FIG. 4 of the drawing, I show a modified form of my invention in which an elongated support member 10a is provided. The support member 10a is a generally inverted T shape, having a horizontal base member 17 and is provided with upstanding friction members 11 adjacent the upper end thereof, as shown. The stockinette member 13 is secured to the elongated support member 10a in the same manner that it is secured to the elongated member 10. That is, the free end 12 of the stockinette member 13 is positioned over the teeth 11 and the adjacent portion of the stockinette member 13 is wrapped under and around the elongated member 10a as at 14 and then is passed over the top of the elongated member 10a as at 16 whereupon the meat product encased in the stockinette member 13 pulls the portion of the stockinette member intermediate the meat product and the free end 12 into firm, overlapping relationship to each other, as shown in FIG. 4 whereby the free end 12 is urged into engagement with the upstanding friction members 11 by the portion of the stockinette member 13 superjacent the free end 12.

From the foregoing, it will be seen that I have devised an improved process for supporting meat products for curing within stockinette-like members. By providing longitudinally spaced, upstanding friction members 11 along the upper surface of the elongated member 10 and placing the free end 12 in contact with the friction members and then wrapping the adjacent portion of the stockinette member 13 under and around the elongated member 10 and then over and around the elongated member 10, the weight of the meat product draws the portion of the stockinette member 13 superjacent the free end 12 into firm engagement with the free end 12 whereby there is no slippage between the free end 12 and the elongated support member. By firmly clamping the free end 12 to the upper portion of the elongated member 10 by moving the superjacent portion of the stockinette into firm engagement therewith, I eliminate entirely the necessity of tying knots in the end of the free end of the stockinette member and also eliminate the necessity of passing hooks, rods or the like through the end of the stockinette member to be attached to the elongated support member. Furthermore, by securing the stockinette member to the elongated member 10 without the use of hooks, rods or the like, the stockinette member 13 and the meat product carried thereby may be readily removed from the supporting bar 10 merely lifting up on the meat product whereby the clamping pressure is removed from the free end 12, thus permitting easy removal of the free end 12 from the supporting bar.

While I have shown my invention in but two forms, it will be obvious to those skilled in the art that it is not so limited, but is susceptible of various other changes and modifications without departing from the spirit thereof.

What I claim is:

1. The process of supporting a meat product for curing within an open-mesh stockinette-like member with one end of said stockinette member being free to extend outwardly of the meat product and terminating in spaced relation to said product, the improvement which comprises the steps of:
   (a) placing the free terminal end of said stockinette member over an elongated support bar having friction members along the upper surface thereof for engaging frictionally said free end of the stockinette member, and
   (b) wrapping a portion of said stockinette member adjacent said free, terminal end around and under said bar and then over and in contact with said free, terminal end so that the weight of the meat product urges the portion of said stockinette member superjacent said free, terminal end into firm engagement with said free, terminal end to secure said stockinette member to said elongated support bar.

References Cited

UNITED STATES PATENTS 2,246,229  6/1941  Wohlmuth _____ 17—44.2

FOREIGN PATENTS 68,968  6/1893  Germany _____ 17—44

LUCIE H. LAUDENSLAGER, Primary Examiner

U.S. Cl. X.R.

17—44.2